(12) United States Patent  
Jani et al.

(10) Patent No.: US 8,756,167 B2  
(45) Date of Patent: Jun. 17, 2014

(54) TRANSMODAL AND LOGISTICS SYSTEM AND METHOD

(75) Inventors: Nilendu G. Jani, Bedford, TX (US); Paul Orsak, Dallas, TX (US); Brian Treat, Irving, TX (US)

(73) Assignee: ZMS Technologies Inc., Farmers Branch, TX (US)

( * ) Notice: Subject to any disclaimer, the term of this patent is extended or adjusted under 35 U.S.C. 154(b) by 0 days.

(21) Appl. No.: 13/032,774

(22) Filed: Feb. 23, 2011

(65) Prior Publication Data

US 2011/0161241 A1 Jun. 30, 2011

Related U.S. Application Data

(63) Continuation of application No. 12/183,039, filed on Jul. 30, 2008, now abandoned.

(60) Provisional application No. 60/962,578, filed on Jul. 30, 2007.

(51) Int. Cl.  
*G06Q 30/00* (2012.01)  
*G06Q 10/08* (2012.01)

(52) U.S. Cl.  
CPC ...... *G06Q 10/0834* (2013.01); *G06Q 10/08345* (2013.01); *G06Q 10/083* (2013.01)  
USPC .......................................... 705/335; 705/334

(58) Field of Classification Search  
CPC ............ G06Q 10/0834; G06Q 10/083; G06Q 10/08345  
USPC ........................................ 705/330, 335, 334  
See application file for complete search history.

(56) References Cited

U.S. PATENT DOCUMENTS

| | | | |
|---|---|---|---|
| 7,711,629 B2 | 5/2010 | Laurent et al. | |
| 7,783,557 B2 | 8/2010 | Laurent et al. | |
| 2002/0019759 A1* | 2/2002 | Arunapuram et al. | 705/7 |
| 2003/0225683 A1* | 12/2003 | Hill et al. | 705/37 |
| 2007/0124009 A1 | 5/2007 | Bradley et al. | |

* cited by examiner

*Primary Examiner* — Allen J Jung  
(74) *Attorney, Agent, or Firm* — Howison & Arnott, L.L.P.

(57) ABSTRACT

A transmodal and logistics method, comprising generating at least one transportation route for shipping a shipment using one or more different transportation modes and at least two transportation providers, and calculating a cost rate associated with the at least one transportation route.

44 Claims, 6 Drawing Sheets

FIG. 3

TRANSPORTATION RATING DATA 79

| | Service | Recommended Price 360 | Cost Rate 362 | Margin 364 | Transportation Route Data 76 | Delivery Date/Time 350 |
|---|---|---|---|---|---|---|
| 1 | Same Day/Next Freight Out | $485.63 USD | $135.10 USD | $350.53 USD | 21 Miles G001 94101→A1... $20.56 USD  •  A1: 0895-73G OAK→BUR $95.63 USD  •  14 Miles G002 A1→90210 $18.91 USD | Tue 02/12 12:56 PST |
| 2 | Same Day/Next Freight Out | $530.63 USD | $124.48 USD | $406.15 USD | 21 Miles G001 94101→A2 $20.56 USD  •  A2: 5563-PA2 OAK→BUR $84.10 USD  •  14 Miles G003 A2→90210 $19.82 USD | Wed 02/13 04:29 PST |
| 3 | Next Day 10 AM | $273.25 USD | $59.08 USD | $214.17 USD | 10 Miles G004 94101→G005 $17.70 USD  •  G005 SFO→LAX $23.68 USD  •  12 Miles G006 G005→90210 $17.70 USD | Wed 02/13 10:00 PST |
| 4 | Next Day 10 AM | $273.25 USD | $69.51 USD | $203.74 USD | 10 Miles G004 94101→G007 $17.70 USD  •  G007 SFO→LAX $34.11 USD  •  12 Miles G006 G007→90210 $17.70 USD | Wed 02/13 10:00 PST |

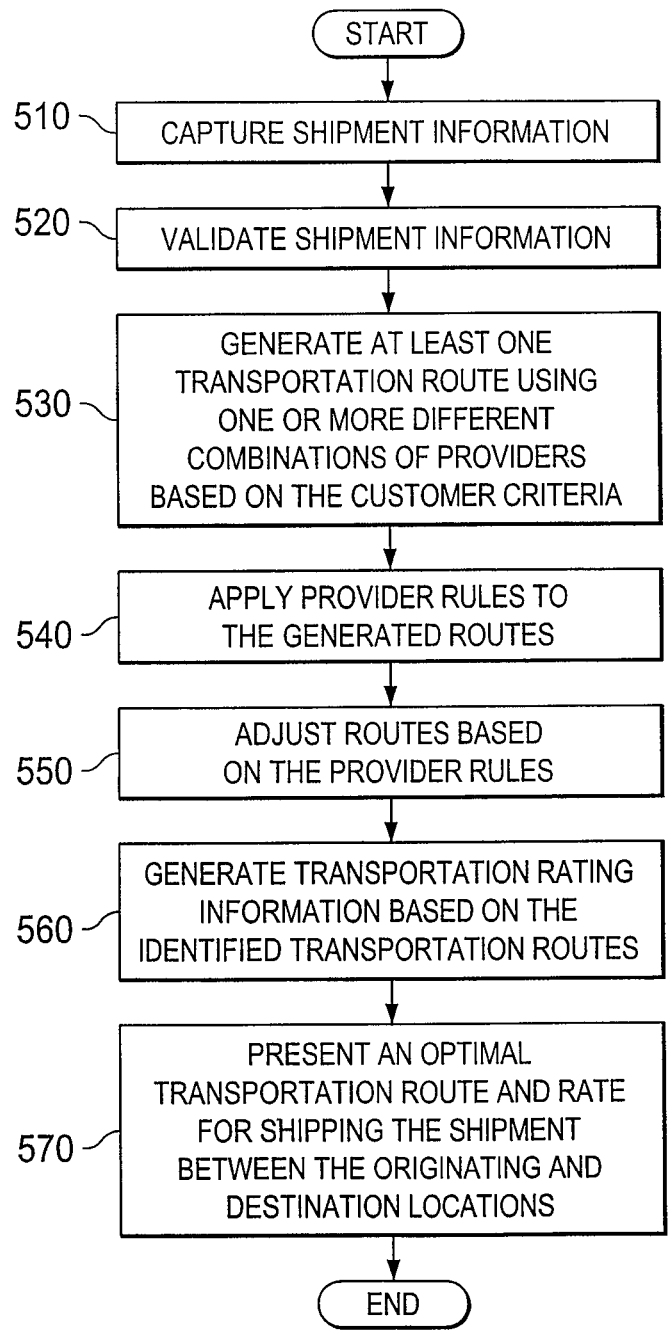

TRANSMODAL AND LOGISTICS SYSTEM AND METHOD

CROSS-REFERENCE TO RELATED APPLICATIONS

This application is a continuation of U.S. patent application Ser. No. 12/183,039, filed Jul. 30, 2008, entitled TRANSMODAL AND LOGISTICS SYSTEM AND METHOD, which claims benefit of U.S. Provisional Application No. 60/962,578, filed Jul. 30, 2007, entitled LOGISTICS MANAGEMENT SYSTEM, the specifications of which are incorporated herein in their entirety.

BACKGROUND OF THE INVENTION

The shipment of packages and/or freight is an age-old method of transporting items from one location to another. Today, packages are shipped using a particular method (e.g., air, ground, rail, ocean, etc.) based on a desired and/or requested delivery date. For example, local domestic packages are shipped via ground using a truck. In some instances, a package is shipped using multiple methods of transportation between the originating and destination locations and are consolidated and deconsolidated several times at the various transportation mode interchange locations before reaching the final destination. However, software solutions are limited and only allow for the manual building of inter-connected routes when the shipments are transported using multiple transportation modes. Additionally, the software solutions are unable to perform the end-to-end shipment route planning that spans multiple transportation modes and/or providers.

BRIEF DESCRIPTION OF THE DRAWINGS

FIG. 3 illustrates an embodiment of transportation route data and transportation rating data for the transmodal and logistics system of FIG. 1;

FIG. 5 is a flowchart illustrating an embodiment of the transmodal and logistics method.

DETAILED DESCRIPTION OF THE DRAWINGS

Figure 1:
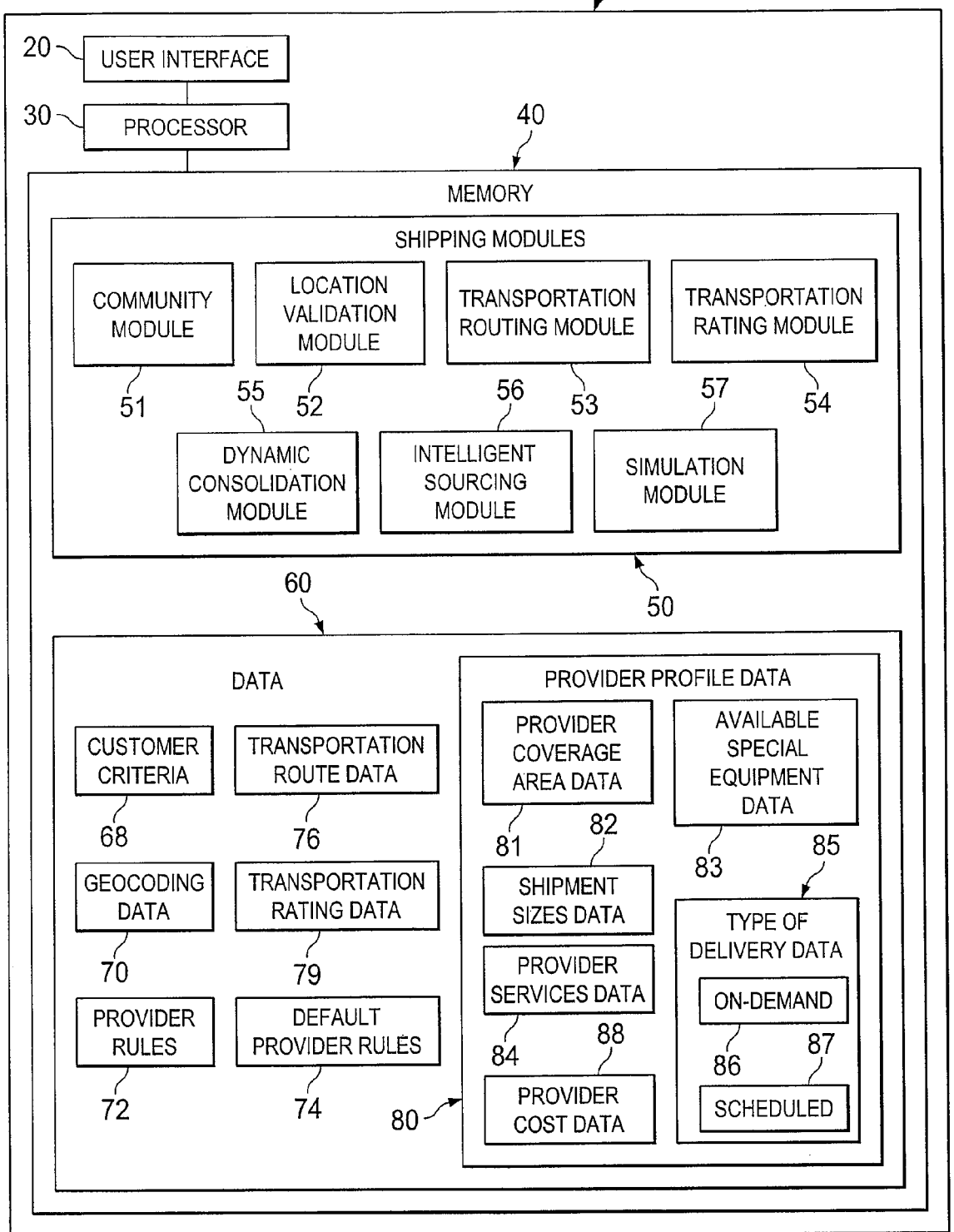
FIG. 1 illustrates an electronic device comprising an embodiment of a transmodal and logistics system.

FIG. 1 illustrates an electronic device 10 comprising an embodiment of a transmodal and logistics system 100. Transmodal and logistics system 100 is configured to identify at least one transportation route for shipping a shipment using one or more different transportation modes and/or providers. In some embodiments, transmodal and logistics system 100 identifies the at least one transportation route based on an originating and destination location, an available pickup date and time, a desired delivery date and time, a provider profile, customer criteria, provider rules, and other constraints.

As used herein, "transmodal" is defined as the ability to transport across multiple transportation modes and/or providers. A "transportation mode" can be any means of transporting and/or shipping a shipment, including, but not limited to, by personal courier, airplane, ground, train, and boat. A "transportation provider" can be any provider which transports using a particular transportation mode or a provider which provides associated transportation and/or logistics services, such as, but not limited, providing a general storage and/or holding facility for the shipment, packaging services (e.g., wrapping shipment in foam) for the shipment, and providing a cold storage holding facility. The "transportation provider" can be the primary provider itself or a third-party provider with which the primary provider has contracted for a particular transportation and/or logistics service.

In FIG. 1, electronic device 10 may comprise any type of portable or non-portable electronic device including, but not limited to, a desktop computer, a laptop computer, a notebook computer, a tablet computer, a personal digital assistant (PDA), a cellular phone or any other type portable and/or non-portable electronic device. In the illustrated embodiment, electronic device 10 comprises a user interface 20, a processor 30, and a memory 40. Components of electronic device 10 may comprise hardware, software, firmware or any combination thereof. In the illustrated embodiment, memory 40 comprises shipping modules 50 and data 60. Shipping modules 50 are executable instructions and/or processes stored in memory 40 which are configured to identify at least one transportation route for shipping the shipment. In FIG. 1, shipping modules 50 comprise a location validation module 52, a transportation routing module 53, a transportation rating module 54, a dynamic consolidation module 55, an intelligent sourcing module 56, and a simulation module 57. Location validation module 52 verifies and/or ensures that an originating and/or pickup location and a destination location for the shipment are valid. Thus, location validation module 52 determines whether the originating and destination locations can be found on a map and have a corresponding identifiable longitude and latitude location.

Transportation routing module 53 identifies possible transportation routes for a shipment based on the originating and delivery locations validated by the location validation module 52. In some embodiments, transportation routing module 52 identifies and strings together one or more transportation segments, each of which represents a portion of the route to be traveled in a single transportation route. In some embodiments, each transportation segment is determined based on a variety of criteria, including, but not limited to, the transportation modes available, the size of the shipment, the provider's licensing certificates, the provider's skill requirements, operational constraints, the provider's rules, the provider's preferences, and the type of special equipment required to load and unload the shipment.

In the illustrated embodiment, transportation rating module 54 calculates the individual and/or total transportation costs associated with each provider identified by transportation routing module 53. In some embodiments, transportation rating module 54 can calculate transportation costs with a built-in profit margin. In some embodiments, transportation rating module 54 can convert the transportation costs into another foreign currency.

In FIG. 1, dynamic consolidation module 55 establishes and/or links the current shipment with at least one other shipment to enable a consolidated shipment at a discounted rate. In some embodiments, the consolidated shipment is based on the shipments which have similar originating and destination locations. In some embodiments, the similar originating and destination locations are a location generally having the same geographic region (e.g., same city, same zip code, etc.). In some embodiments, the consolidated shipment is based on shipments having similar originating and destination locations for the entire transportation route and/or at least a portion of the transportation route or one or more transportation segments.

In the illustrated embodiment, shipping modules 50 also comprise intelligent sourcing module 56 which identifies a central location to consolidate multiple shipments that may have a number of different starting locations so that a single arrival of the multiple shipments can be made at the destination location. For example, shipping module 50 may coordinate the shipment of a single product which has multiple components stored at different facilities. In this embodiment, shipping module 50 may identify a central location to which all the components may be shipped and then consolidate the multiple components for a single shipment to an identified delivery location.

In FIG. 1, simulation module 57 enables a provider and/or any other user to run shipment simulations using transportation routing module 53. In some embodiments, simulation module 57 identifies optimal shipping scenarios and/or sourcing strategies to understand the individual provider's and/or user's business impact from a timing and cost perspective. In some embodiments, simulation module 57 simulates the transportation routes available for an example aggregate set of shipments and identifies the costs and potential savings for various "what if" scenarios.

In FIG. 1, memory 40 also comprises data 60 used by one or more of shipping modules 50 to execute each of shipping modules 50. It should be understood that data 60 can be stored in memory 40 in any format, including, but not limited to, an eXtensible Markup Language (XML) database, a relational database, a file, or a list. In the illustrated embodiment, data 60 comprises customer criteria 68, geocoding data 70, provider rules 72, default provider rules 74, transportation route data 76, transportation route costs 79, and provider profile data 80. In FIG. 1, customer criteria 68 list information that the customer provides when requesting a shipment of their respective package. For example, customer criteria 68 may comprise an originating location, a destination location, and a timeframe for which the package is to be delivered. Geocoding data 70 is utilized by the location validation module 52 to validate the starting and the destination location. Provider rules 72 are the rules and/or criteria established by a particular provider for transporting particular types of shipments. For example, provider rules 72 may specify that, for a small package to be shipped overseas, the shipment must first be delivered to a specified gateway airport to be flown to a destination gateway airport and subsequently delivered by truck to the final destination. A "destination gateway airport," as used herein, is an airport capable of and/or authorized to transport packages internationally. As another example, provider rules 72 may indicate that large shipments with certain characteristics (e.g., containing a particular hazardous material or perishables) be shipped within appropriate transportation specific containers and/or combined with other appropriate shipments (e.g., ensuring that the hazardous material is not shipped with other materials which could cause the hazardous material to explode, shipping perishables in containers designed to maintain a certain temperature and humidity level, etc.). In the illustrated embodiment, default provider rules 74 is a list of default rules which are used in place of provider rules 72 if no specific provider rules are provided. In some embodiments, provider rules 72 comprises a list of approved providers for a given geographic region or geographic lane. A "geographic lane" as used herein is a geographic region (e.g., a country, a city, etc.) between the originating and destination location.

Transportation route data 76 comprises data stored after transportation routing module 53 is executed. Transportation route data 76 comprises at least one or more transportation routes for shipping a shipment. Each transportation route identified in transportation data 76 may comprise one or more segments and/or one or more providers which constitutes the entire transportation route identified by transportation routing module 53. For example, one transportation route may comprise ten segments, each of the segments representing a point in between the starting location and the destination location. Each of the ten segments may also have a different provider who is responsible for the transportation for their respective segment. In some embodiments, the segments are optimally linked together so that one transportation route is formed to minimize cost and time and/or adhere to other key attributes (e.g., maintain reliability, ensure a particular profit/cost margin, etc.). Each transportation segment typically comprises an originating location and a destination location, with each representing a pick-up and drop-off location for a particular provider.

Transportation rating data 79 comprises cost information associated with each transportation route identified by transportation routing module 53. In some embodiments, transportation rating data 79 comprises information associated with each individual transportation segment and/or the cost of the entire transportation route. In some embodiments, transportation rating data 79 comprises a profit margin or a percent of profit margin which can be used to calculate a total cost that includes the profit margin.

In FIG. 1, provider profile data 80 is a list of information associated with each provider. For example, in FIG. 1, provider profile data 80 comprises provider coverage area data 81, shipment size data 82, available special equipment data 83, provider services data 84, type of delivery data 85, and provider cost data 88. It should be understood, however, that provider profiled data 80 can comprise more or fewer data than illustrated. Provider coverage area data 81 indicates the area of operation for the particular provider. In some embodiments, provider coverage area data 81 indicates the transportation routes, transportation segments, and drop-off and/or pick-up locations for that particular provider. Shipment size data 82 identifies the sizes of shipments in which the provider can transport (e.g., any shipment under 500 pounds, shipments having a size less than 24'×24'×24', etc.). Available special equipment data 83 indicates the types of shipping vehicles provided by and/or utilized by a particular provider (e.g., flatbeds, straight truck, fifty-three foot (53') trailer, cargo transporter, commercial airline jet, etc.). Provider services data 84 identifies the special services provided by the provider, including, but not limited to, particular lifting equipment (e.g., fork truck, crane, etc.) and the speed of delivery of the shipment (e.g., same day, overnight, six weeks, etc.). FIG. 1 indicates two types of deliveries 85 in which providers are typically categorized: (1) on-demand type 86 and (2) scheduled type 87. An on-demand 86 provider is one which can be arranged generally at any time to provide a particular shipping service. Example on-demand 86 providers include, but are not limited to, a courier, a pick-up and delivery provider, a truckload provider, and a chartered airplane. Scheduled 87 providers have a pre-determined and/or pre-set schedule having a particular arrival and/or departure time. Examples of scheduled 87 providers include, but are not limited to, a commercial airline, a bus, a less than a truckload provider, and a train. Provider cost data 88 includes information associated with shipping a particular shipment based on the other information associated with the provider. For example, in some embodiments, provider cost data 88 comprises cost information based on the shipment sizes identified in shipment sizes data 82 or available special equipment data 83. In some embodiments, provider cost data 85 may vary based on the coverage area specified in provider coverage area data 81.

Thus, in operation, a customer enters shipping information regarding the shipment, such as, but not limited to, the shipment size, the starting location, and destination location of the shipment. The information is captured and stored by transportation routing module 53 as customer criteria 68. Location validation module 52 then validates the starting location and the destination location stored in customer criteria 68. Transportation routing module 53 then references provider profile data 80 to identify the providers which can ship the shipment for a portion of and/or the entire distance between the originating location and the destination location. In some embodiments, transportation routing module 53 compares the customer criteria 68 against the provider profile data 80. For example, if customer criteria 68 identify that the shipment is a large shipment, transportation routing module 53 then references shipment sizes data 82 and transportation network data 80 to identify the available providers. As another example, if customer criteria 68 identifies a starting location as a residence or a business location, then transportation routing module 53 references type of delivery data 85 to identify an on-demand 86 provider to pick-up the shipment from customer location. As another example, if customer criteria 68 identify that special equipment such as a forklift or a crane is required to pick-up the shipment, then transportation routing module 53 references provider services data 84 and shipment sizes data 82 to identify which providers have such a service and/or transportation vehicle available to accommodate a large shipment.

Transportation routing module 53 then generates at least one transportation route using one or more different combinations of identified providers based on customer criteria 68. In some embodiments, the transportation routes comprise one or more transportation segments are strung and/or linked together by transportation routing module 53. Transportation routing module 53 then stores the different transportation routes as transportation route data 76. Transportation routing module 53 then applies provider rules 72 or default provider rules 74 depending on whether the provider has a customized set of provider rules 72. Provider rules 72 identify any patterns and/or specific rules that have been established by the providers. For example, in some embodiments, provider rules 72 may indicate that any large package must be shipped first by truck and then by boat to any destination location that has an ocean between the starting location and the destination location. In this embodiment, transportation routing module 53 then adjusts the transportation routes stored in transportation route data 76 based on either provider rules 72 or default provider rules 74. In some embodiments, transportation routing module 53 may replace each of the providers in each of the transportation segments and/or transportation routes that do not conform to provider rules 72 with a provider which conforms to provider rules 72 or default provider rules 74. In some embodiments, transportation routing, module 53 may filter the transportation routes, leaving those transportation routes which conform to provider rules 72 or default provider rules 74. In some embodiments, transportation routing module 53 stores the new transportation routes (e.g., the transportation routes identified after applying provider rules 72 or default provider rules 74) as transportation route data 76. In some embodiments, transportation routing module stores the new transportation routes as a separate component in data 60.

Transportation rating module 54 then evaluates and/or reviews the transportation routes identified by transportation routing module 53 and calculates a cost for shipping the shipment and other specified services (e.g., packaging the shipment with foam, etc.) based on that particular transportation route. In some embodiments, transportation rating module 54 references provider cost data 88 to determine the cost associated with each transportation route. In some embodiments, transportation rating module 54 calculates the cost to a particular provider for that particular shipment. In some embodiments, transportation rating module 54 calculates a recommended cost for which the provider should charge the customer based on a target and/or specified margin and/or profit amount. The costs associated with each transportation route are stored as transportation route costs 79 and presented to the user via user interface 20. In some embodiments, transportation rating module 54 presents only the lowest cost for transporting the shipment. In some embodiments, transportation rating module presents a portion or all of the alternative transportation routes and associated costs thereof for selection by the user.

Figure 2:
FIG. 2 illustrates an embodiment of customer criteria for the transmodal and logistics system of FIG. 1.

FIG. 2 illustrates an embodiment of customer criteria 68 for transmodal and logistics system 100 of FIG. 1. In some embodiments, customer criteria 68 are the information/data entered by a customer regarding a particular shipment. Customer criteria 68 are used to determine the transportation routes and cost rates associated with shipping the particular shipment. In FIG. 2, customer criteria 68 indicates that John Doe's Auto Center has a package which needs to be shipped from 123 Midway Avenue, San Francisco, Calif. 94101 to 456 State Street, Beverly Hills, Calif. 90210. The expected delivery timeframe is "same day." It should be understood, however, that fewer or more data may be included in customer criteria 68.

FIG. 3 illustrates an embodiment of transportation route data 76 and transportation rating data 79 for transmodal and logistics system 100 of FIG. 1. In the illustrated embodiment, transportation route data 76 and transportation rating data 79 are illustrated for a single provider who uses several third-party providers for one or more of the transportation segments for one of the transportation routes. In some embodiments, the single provider may transport the shipment for a portion or the entire transportation route and not utilize the services of a third-party provider. In the illustrated embodiment, transportation route data 76 and transportation rating data 79 are presented in combination; however, it should be understood that, in some embodiments, transportation route data 76 and transportation rating data 79 may be presented separately.

FIG. 3 illustrates provider transportation options 300, 310, 320, and 330. Each of transportation options 300 through 330 identifies provider service data 84, transportation rating data 79, transportation route data 76, and delivery date/time 350. In FIG. 3, provider service data 84 indicates the speed with which the shipment is delivered. For example, provider transportation options 300 and 310 are "Same Day/Next Flight Out" delivery speed. In FIG. 3, transportation rating data 79 comprises a recommended price 360, a cost rate 362, and margin 364. Recommended price 360 is the customer's cost for shipping the requested shipment based on the actual cost for shipping the shipment (e.g., as reflected in cost rate 362) and a profit margin identified by a provider (e.g., as reflected in margin 364). Thus, recommended price 360 is the combination of cost rate 362 and margin 364. Cost rate 362 is the cost for shipping the shipment using the transportation route illustrated by transportation route data 76 for each of transportation options 300 through 330. Thus, cost rate 362 is the combination of all the costs charged by each of the providers indicated in transportation route data 76. Margin 364 is the amount of profit or the desired margin with which the provider prefers to operate.

In FIG. 3, each of provider transportation options 300 through 330 comprises a different transportation route within transportation route data 76. For example, in option 300, the first transportation segment of the transportation route begins with a ground pick-up from the originating location having a zip code of 94101 using a ground transport vehicle G001. Ground transport vehicle G001 travels 21 miles to deliver the shipment to an airport to be transported by an airline A1 on flight number 0895-73G from OAK to BUR for the second transportation segment of the transportation route. Upon arrival at BUR, a ground transport vehicle G002 transports the shipment for 14 miles to the destination location having a zip code 90210 for the final segment of the transportation route. The provider cost of the first transportation segment is $20.56 United States Dollars ("USD"), the second is $95.63 USD, and the final is $18.91 USD. Therefore, the total provider cost is $135.10 USD, as reflected by provider transportation cost rate 362 for provider transportation option 300.

As another example, in provider transportation option 320, the first transportation segment of the transportation route begins with a ground pick-up from the originating location having a zip code of 94101 using a ground transport vehicle G004. Ground transport vehicle G004 transports the shipment for 10 miles to a drop-off location (e.g., SFO) so that a ground transport vehicle G005 can transport the shipment between SFO and LAX for the second segment of the transportation route. In the final segment, ground transport vehicle G005 transfers the shipment in LAX for ground transport vehicle G006 to travel 12 miles to deliver the shipment to destination location having a zip code 90210. The provider cost of the first transportation segment is $17.70 USD, the second is $23.68, and third is $17.70 USD. The total provider cost is $59.08 USD, as reflected by cost rate 362 for provider transportation option 320.

In Figure, it should be understood that, in some embodiments, the same provider can provide one or more of the transportation segments. Furthermore, in the illustrated embodiment, each of the routes in transportation route data 76 uses three different providers. However, it should be understood that more or fewer providers can be used for each transportation route, and/or each transportation route may comprise more or fewer transportation segments.

In FIG. 3, provider transportation option 300 is highlighted and/or selected by a user as the optimal provider transportation option. In this embodiment, the customer indicated that the shipment needed to be delivered the same day. Thus, provider transportation option 300 provides the desired delivery schedule for the lowest cost. Therefore, in this embodiment, provider transportation option 300 was the optimal provider transportation option. It should be understood, however, that a different provider transportation option may be selected depending on various customer criteria 68 and/or provider rules 72. For example, provider rules 72 may indicate that the route with the largest and/or greatest margin 364 is the optimal provider transportation option. Therefore, in the illustrated embodiment, provider transportation option 310 is the optimal provider transportation option.

Figure 4A:
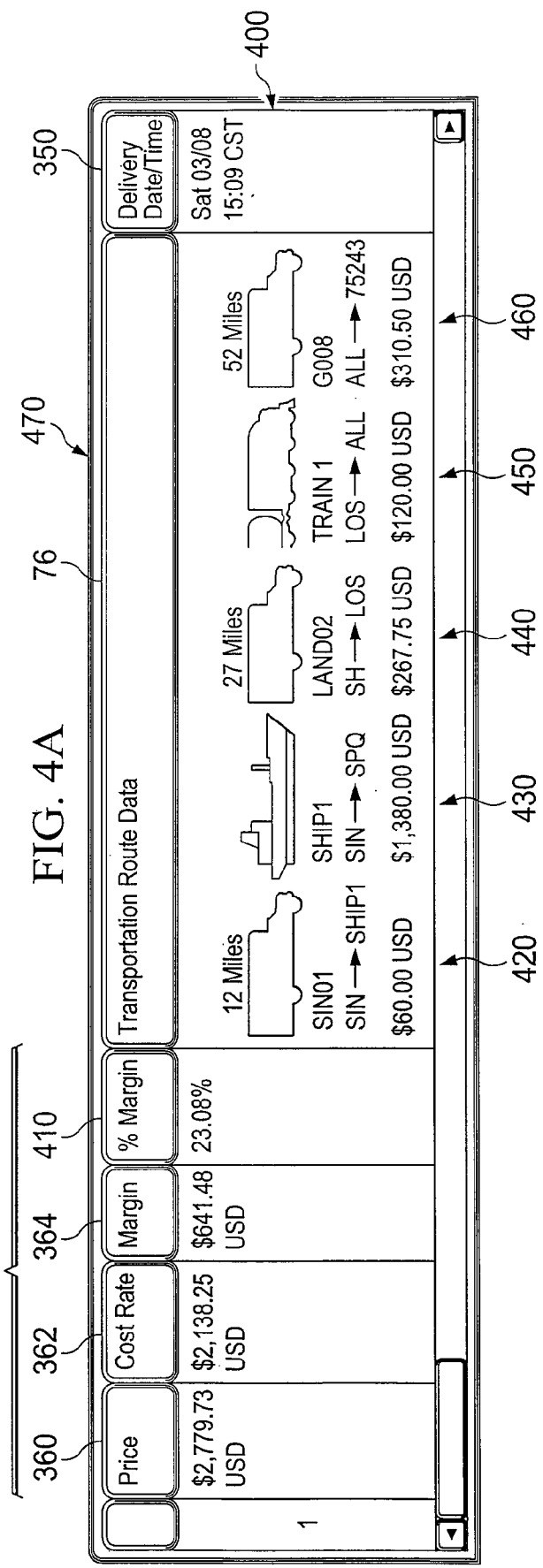
FIGS. 4A and 4B illustrate another embodiment of transportation route data and transportation rating data for the transmodal and logistics system of FIG. 1.
Figure 4B:
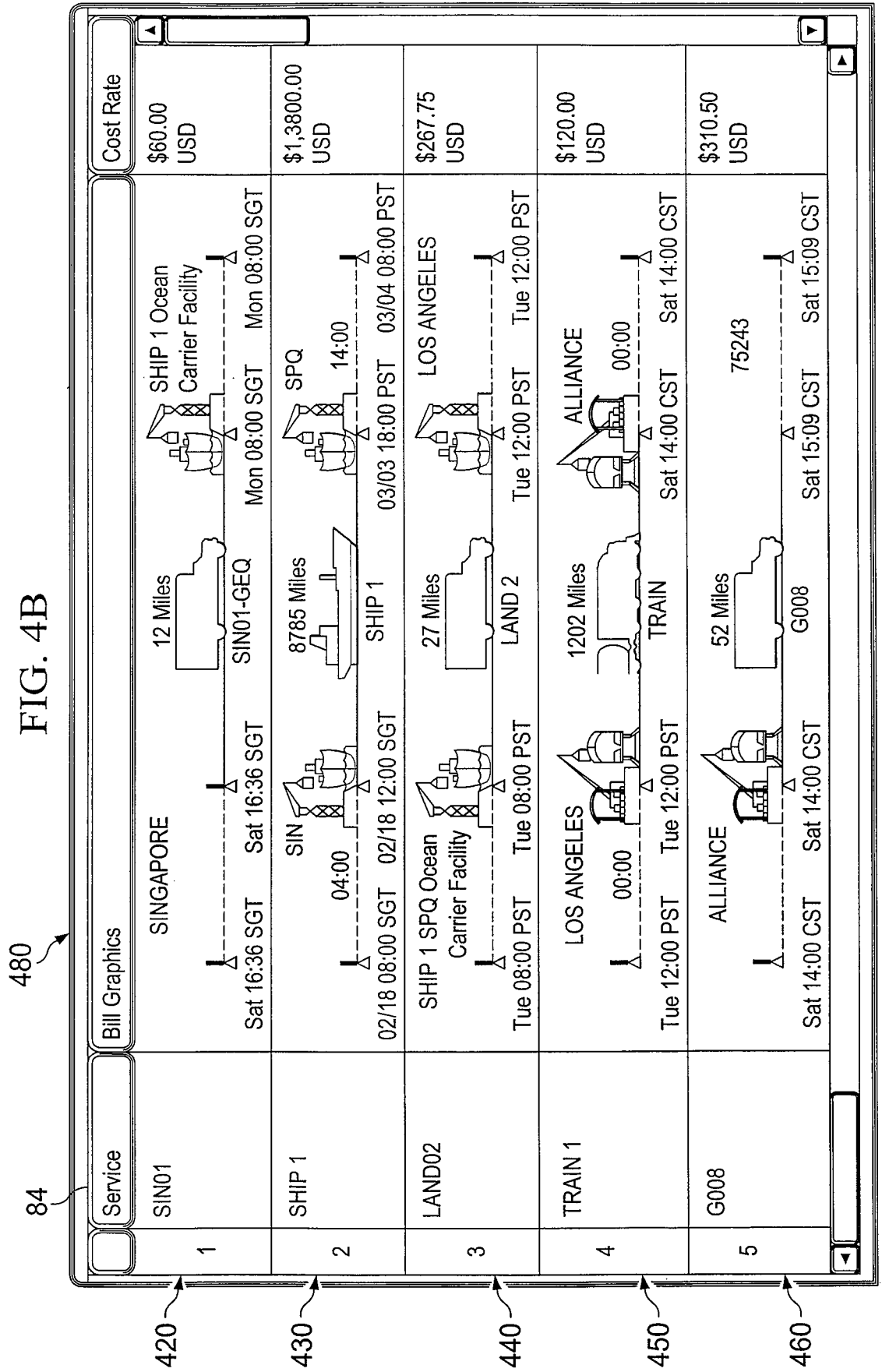

FIGS. 4A and 4B illustrate another embodiment of transportation route data 76 and transportation rating data 79 for transmodal and logistics system 100 of FIG. 1. In the illustrated embodiment, transportation route data 76 and transportation rating data 79 are presented in combination; however, it should be understood that, in some embodiments, transportation route data 76 and transportation rating data 79 may be presented separately.

FIG. 4A illustrates window 470, FIG. 4B illustrates window 480. Each of windows 470 and 480 are illustrated as a graphical user interface (GUI). Window 470 illustrates provider transportation option 400. Window 480 illustrates transportation details for each of the transportation segments (e.g., transportation segments 420, 430, 440, 450, and 460) indicated in transportation route data 76 for provider transportation option 400.

Regarding FIG. 4A, window 470 illustrates provider transportation option 400 having transportation rating data 79, transportation route data 76, and delivery date/time 350. In FIG. 4, transportation rating data 79 comprises recommended price 360, cost rate 362, margin 364, and a margin percentage ("% margin") 410. % margin 410 is the percentage of recommended price 360 which comprises margin 364. Thus, % margin 410 is equal to margin 364 divided by recommended price 360. Thus, in the illustrated embodiment, margin 364 constitutes 23.08% (e.g., $ margin 410) of recommended price 360 (e.g., $2,779.73 USD).

Regarding FIG. 4B, the transportation route for provider transportation option 400 comprises five transportation segments, namely transportation segments 420, 430, 440, 450, and 460. Window 480 illustrates the transportation details for each of transportation segments 420 through 460. For example, the originating location for the shipment is Singapore. Thus, for the first transportation segment, Singapore Pickup and Delivery (PUD) Service is the provider to transport the shipment for 12 miles from the originating location to SHIP1. Specifically, Singapore PUD Service is expected to pick-up the shipment on Saturday (Sat) at 16:36 Singapore time (SGT) and arrives at SHIP1's Ocean Carrier Facility for a Monday, 08:00 SGT departure time. The cost for transportation segment 420 is $60.00 USD. The shipment then travels on transportation segment 430 across the ocean on SHIP1's boat, leaving SHIP1's Ocean Carrier Facility on February 18 at 08:00 SGT. SHIP1 then travels for 4 hours and arrives at SIN at 12:00 SGT on February 18. Thereafter, SHIP1 travels 8785 miles to SPQ, arriving at SPG at 18:00 Pacific Standard Time (PST) on March 3. The cost for transportation segment 430 is $1380. Thereafter, the shipment travels by ground transportation using Land Air LAX PUD Service (LAND02) as the provider for transportation segment 440. Then, for transportation segment 450, the shipment travels by rail using TRAIN1 as the provider. For final transportation segment 460, the shipment gravels by ground using ground transportation vehicle G008 to reach the destination location on Sat. at 15:09 Central Standard Time (CST).

Thus, FIGS. 4A and 4B illustrate an embodiment of transportation route data 76 and transportation rating data 79 for transmodal and logistics system 100 of FIG. 1. It should be understood, however, that more or fewer transportation routes than illustrated may be used to transport the shipment. Additionally, it should be understood that more or fewer details regarding each of transportation segments 420 through 460 may be provided.

FIG. 5 is a flowchart illustrating an embodiment of the transmodal and logistics method. The method begins with block 510 in which transportation routing module 53 captures shipment information from customer criteria 68 for transporting/shipping a shipment. Transportation routing module 53 then validates the shipment information in customer criteria 68 using location validation module 52 (block 520). Transportation routing module 53 then generates automatically at least one transportation route using one or more different combinations of providers based on customer criteria 68 (block 530). Transportation routing module 53 then applies either provider rules 72 or default provider rules 74 to the generated routes (block 540). Transportation routing module 53 then adjusts the transportation routes based on provider rules 72 or default provider rules 74 so that the transportation routes conform to the respective provider rules 72 or default provider rules 74 (block 550). Transportation rating module then generates transportation rating information based on the identified transportation routes (block 560). Transportation rating module then presents an optimal transportation route and rate for shipping the shipment between the originating and destination locations (block 570), with the method terminating thereafter.

The illustrative embodiment maybe implemented in software and can be adapted to run on different platforms and operating systems. In particular, functions implemented by wireless network communications system 100 for example maybe provided by an ordered listing of executable instructions that can be embodied in any computer readable medium for use by or in connection with an instruction execution system apparatus or device such as a computer based system, processor containing system or other system that can fetch the instructions from the instruction execution system apparatus or device and execute the instructions. In the context of this document a "computer readable medium" can be any means that can contain, store, communicate, propagate, or transport the program for use by or in connection with the instruction execution system apparatus or device. The computer readable medium for example that is not limited to an electronic magnetic optical, electro magnetic infrared or semiconductor system apparatus device or propagation medium.

Therefore, embodiments of transmodal and logistics system 100 enable a provider to identify the most cost effective method and transportation means for shipping a shipment. Furthermore, transmodal and logistics system 100 also enables a provider to use a number of different combinations of third-party providers and automatically generate transportation routes based on the different combination of third-party providers without user intervention. Additionally, transmodal and logistics system 100 allows for the incorporation of logistics services providers in addition to transportation providers providing different modes of transportation. Moreover, transmodal and logistics system 100 enables a provider to establish a set of rules which govern which providers to use and the criteria limiting the providers.

What is claimed is:

1. A method for generating a plurality of transmodal shipment routes from a first location to a second location, comprising the steps of:
   receiving by a computer processor shipping data defining requirements for a transmodal shipment;
   accessing by a computer processor shipping provider data, the shipping provider data having shipping provider rules associated therewith;
   determining by a computer processor a plurality of segments of the transmodal shipment route interconnecting the first location to the second location, each segment of the plurality of segments selected using the shipping data, transportation modes available, a size of the transmodal shipment, a shipping provider's licensing certificates and skill requirements, operational constraints and equipment required to load and unload the transmodal shipments, wherein at least two of the plurality of segments use different shipment modes;
   determining by a computer processor a plurality of shipping providers for providing shipping services on at least one of the plurality of segments responsive to the shipping data and the shipping provider rules;
   generating by a computer processor the plurality of transmodal routes from the first location to the second location from the plurality of segments and the plurality of shipping providers responsive to a plurality of requirements defined by the shipping data and the shipping provider data, each of the plurality of transmodal routes having at least two of the plurality of segments using a different shipping mode and a different shipping provider;
   determining by a computer processor a segment cost associated with each of the plurality of segments and a selected shipping provider for the segment and a route cost comprising a plurality of segment costs for each of the plurality of transmodal routes; and
   displaying via a graphical user interface the plurality of transmodal routes and the associated route cost and segment costs associated with the route cost.

2. The method of claim 1 further comprising the step of determining by a computer processor a geographic position of the first location and the second location.

3. The method of claim 1 further including the step of providing by a computer processor an indication of a best transmodal route of the at least one transmodal route based upon time.

4. The method of claim 1 further including the step of providing by a computer processor an indication of a best transmodal route of the at least one transmodal route based upon cost.

5. The method of claim 1 further including the steps of:
   receiving by a computer processor second shipping data defining requirements for a second transmodal shipment;
   determining by a computer processor a second plurality of segments of the second transmodal shipment route responsive to the second shipping data; and
   determining by a computer processor a second plurality of shipping providers for providing shipping services on at least one of the second plurality of segments responsive to the second shipping data and the shipping provider rules.

6. The method of claim 5, wherein the step of generating the at least one transmodal route further comprises the steps of:
   combining by a computer processor segment data relating to the transmodal shipment and the second transmodal shipment; and
   generating by a computer processor the at least one transmodal route for the first transmodal shipment and the second transmodal shipment wherein the first transmodal shipment and the second transmodal shipment are combined into a single transmodal shipment for at least one common segment of the first plurality of segments and the second plurality of segments.

7. The method of claim 1, wherein the step of generating the at least one transmodal route further comprises the step of simulating by a computer processor a plurality of different transmodal routes.

8. The method of claim 7, wherein the step of determining a segment cost further comprises the step of simulating by a computer processor a cost for the plurality of different transmodal routes.

9. The method of claim 1, wherein the step of displaying further comprises the step of displaying data describing each segment of the transmodal route and a cost associated with each of the segments of the transmodal route.

10. The method of claim 1, wherein the step of determining a segment cost further comprises the steps of:
   determining by a computer processor an actual cost associated with a segment;

determining by a computer processor a profit margin associated with the segment; and determining by a computer processor the segment cost responsive to the actual cost and the profit margin.

11. The method of claim 1, wherein the step of accessing further comprises the step of accessing by a computer processor a local database including the shipping provider data.

12. The method of claim 1, wherein the step of generating the at least one transmodal route comprises the step of combining by a computer processor a selected plurality of segments of the plurality of segments based upon cost of the at least one transmodal route.

13. The method of claim 1, wherein the step of generating the at least one transmodal route comprises the step of combining by a computer processor a selected plurality of segments of the plurality of segments based upon time of the at least one transmodal route.

14. The method of claim 1, wherein the step of generating the at least one transmodal route comprises the step of combining by a computer processor a selected plurality of segments of the plurality of segments based upon reliability of the at least one transmodal route.

15. The method of claim 1, wherein the step of generating the at least one transmodal route comprises the step of combining by a computer processor a selected plurality of segments of the plurality of segments based upon a cost margin of the at least one transmodal route.

16. The method of claim 1, wherein the execution of the set of instructions by the general purpose computer configures the general purpose computer to generate the at least one transmodal route by combining a selected plurality of segments of the plurality of segments based upon time of the at least one transmodal route.

17. The method of claim 1, wherein the execution of the set of instructions by the general purpose computer configures the general purpose computer to generate the at least one transmodal route by combining a selected plurality of segments of the plurality of segments based upon reliability of the at least one transmodal route.

18. The method of claim 1, wherein the execution of the set of instructions by the general purpose computer configures the general purpose computer to generate the at least one transmodal route by combining a selected plurality of segments of the plurality of segments based upon a cost margin of the at least one transmodal route.

19. an apparatus, comprising:
a processor; and
a memory containing a set of instructions for a general purpose computer;
wherein execution of the set of instructions by the general purpose computer configures the processor to:
receive shipping data defining requirements for a transmodal shipment;
access shipping provider data, the shipping provider data having shipping provider rules associated therewith;
determine a plurality of segments of the transmodal shipment route interconnecting the first location to the second location, each segment of the plurality of segments selected using the shipping data, transportation modes available, a size of the transmodal shipment, a shipping providers licensing certificates and skill requirements, operational constraints and equipment required to load and unload the transmodal shipments, wherein at least two of the plurality of segments use different shipment modes;

determine a plurality of shipping providers for providing shipping services on at least one of the plurality of segments responsive to the shipping data and the shipping provider rules;

generate a plurality of transmodal routes from the first location to the second location from the plurality of segments and the plurality of shipping providers responsive to a plurality of requirements defined by the shipping data and the shipping provider data, each of the plurality of transmodal routes having at least two of the plurality of segments using a different shipping mode and a different shipping provider;

determine a segment cost associated with each of the plurality of segments and a selected shipping provider for the segment and a route cost comprising a plurality of segment costs for each of the plurality of transmodal routes; and display via a graphical user interface the at least one transmodal route and the associated route cost and segment costs associated with the route cost.

20. The apparatus of claim 19 wherein the execution of the set of instructions by the general purpose computer configures the processor to determine a geographic position of the first location and the second location.

21. The apparatus of claim 19 wherein the execution of the set of instructions by the general purpose computer configures the processor to provide an indication of a best transmodal route of the at least one transmodal route based upon time.

22. The apparatus of claim 19 wherein the execution of the set of instructions by the general purpose computer configures the processor to provide an indication of a best transmodal route of the at least one transmodal route based upon cost.

23. The apparatus of claim 19 wherein the execution of the set of instructions by the general purpose computer configures the processor to:
receive second shipping data defining requirements for a second transmodal shipment;
determine a second plurality of segments of the second transmodal shipment route responsive to the second shipping data; and
determine a second plurality of shipping providers for providing shipping services on at least one of the second plurality of segments responsive to the second shipping data and the shipping provider rules.

24. The apparatus of claim 23 wherein the execution of the set of instructions by the general purpose computer configures the processor to:
combine segment data relating to the transmodal shipment and the second transmodal shipment; and
generate the at least one transmodal route for the first transmodal shipment and the second transmodal shipment wherein the first transmodal shipment and the second transmodal shipment are combined into a single transmodal shipment for at least one common segment of the first plurality of segments and the second plurality of segments.

25. The apparatus of claim 19 wherein the execution of the set of instructions by the general purpose computer configures the processor to generate the at least one transmodal route further comprises the step of simulating a plurality of different transmodal routes.

26. The apparatus of claim 25 wherein the execution of the set of instructions by the general purpose computer configures the processor to simulate a cost for the plurality of different transmodal routes.

27. The apparatus of claim 19 wherein the execution of the set of instructions by the general purpose computer configures the processor to display data describing each segment of the transmodal route and a cost associated with each of the segments of the transmodal route.

28. The apparatus of claim 19 wherein the execution of the set of instructions by the general purpose computer configures the processor to:
determine an actual cost associated with a segment;
determine a profit margin associated with the segment; and
determine the segment cost responsive to the actual cost and the profit margin.

29. The apparatus of claim 19, wherein the execution of the set of instructions by the general purpose computer configures the processor to access a local database including the shipping provider data.

30. The apparatus of claim 19, wherein the execution of the set of instructions by the general purpose computer configures the processor to generate the at least one transmodal route by combining a selected plurality of segments of the plurality of segments based upon cost of the at least one transmodal route.

31. A system for generating a plurality of transmodal shipment routes from a first location to a second location, comprising:
a database of shipping providers, each of the shipping providers having shipping provider rules associated therewith;
a processor for implementing a transportation routing module that determines a plurality of segments of the transmodal shipment route interconnecting the first location to the second location, the processor configured to:
receive shipping data defining requirements for a transmodal shipment;
access shipping provider data, the shipping provider data having the shipping provider rules associated therewith;
determine a plurality of segments of the transmodal shipment route interconnecting the first location to the second location, each segment of the plurality of segments selected using the shipping data, transportation modes available, a size of the transmodal shipment, a shipping providers licensing certificates and skill requirements, operational constraints and equipment required to load and unload the transmodal shipments, wherein at least two of the plurality of segments use different shipment modes;
determine a plurality of shipping providers for providing shipping services on at least one of the plurality of segments responsive to the shipping data and the shipping provider rules;
generate the plurality of transmodal routes from the first location to the second location from the plurality of segments and the plurality of shipping providers responsive to a plurality of requirements defined by the shipping data and the shipping provider data, each of the plurality of transmodal routes having at least two of the plurality of segments using a different shipping mode and a different shipping provider;
determine a segment cost associated with each of the plurality of segments and a selected shipping provider for the segment and a route cost comprising a plurality of segment costs for each of the plurality of transmodal routes; and
a graphical user interface for displaying the plurality of transmodal routes and the segment costs associated with the route cost.

32. The system of claim 31 wherein the processor is further configured to determine a geographic position of the first location and the second location.

33. The system of claim 31 wherein the processor is further configured to determine a best transmodal route of the at least one transmodal route based upon time.

34. The system of claim 31 wherein the processor is further configured to determine a best transmodal route of the at least one transmodal route based upon cost.

35. The system of claim 31 wherein the processor is further configured to determine a second plurality of segments of the second transmodal shipment route responsive to received second shipping data, determine a second plurality of shipping providers for providing shipping services on at least one of the second plurality of segments responsive to the second shipping data and the shipping provider rules, combine segment data relating to the transmodal shipment and the second transmodal shipment and generates the at least one transmodal route for the first transmodal shipment and the second transmodal shipment, wherein the first transmodal shipment and the second transmodal shipment are combined into a single transmodal shipment for at least one common segment of the first plurality of segments and the second plurality of segments.

36. The system of claim 31, wherein the processor is further configured to simulate a plurality of different transmodal routes responsive to a plurality of different options provided to the simulation module.

37. The system of claim 31, wherein the processor is further configured to determine a cost for the plurality of different transmodal routes.

38. The system of claim 31, wherein the graphical user interface displays data describing each segment of the transmodal route and a cost associated with each of the segments of the transmodal route.

39. The system of claim 31, wherein the processor is further configured to determine an actual cost associated with a segment, a profit margin associated with the segment and the segment cost responsive to the actual cost and the profit margin.

40. The system of claim 31 wherein the database comprise a local database.

41. The system of claim 31, wherein the processor is configured to generate the plurality of transmodal routes by combining a selected plurality of segments of the plurality of segments based upon cost of the plurality of transmodal routes.

42. The system of claim 31, wherein the processor is configured to generate the plurality of transmodal routes by combining a selected plurality of segments of the plurality of segments based upon time of the plurality of transmodal routes.

43. The system of claim 31, wherein the processor is configured to generate the plurality of transmodal routes by combining a selected plurality of segments of the plurality of segments based upon reliability of the plurality of transmodal routes.

44. The system of claim 31, wherein the processor is configured to generate the plurality of transmodal routes by combining a selected plurality of segments of the plurality of segments based upon a cost margin of the plurality of transmodal routes.

* * * * *